United States Patent
Nekrasovskaia et al.

(10) Patent No.: US 6,792,100 B2
(45) Date of Patent: Sep. 14, 2004

(54) METHOD AND APPARATUS FOR SHARING POINT CODES IN A NETWORK

(75) Inventors: Sofia Nekrasovskaia, Delray Beach, FL (US); Charles Chaney, Parkland, FL (US)

(73) Assignee: Siemens Information and Communication Networks, Inc., Boca Raton, FL (US)

( * ) Notice: Subject to any disclaimer, the term of this patent is extended or adjusted under 35 U.S.C. 154(b) by 427 days.

(21) Appl. No.: 10/094,066

(22) Filed: Mar. 8, 2002

(65) Prior Publication Data

US 2003/0169867 A1 Sep. 11, 2003

(51) Int. Cl.[7] .............. H04J 3/12; H04L 12/66; H04M 7/00
(52) U.S. Cl. ............ 379/230; 370/353; 370/524; 379/221.1; 379/221.14
(58) Field of Search .................. 370/352, 353, 370/467, 524; 379/219, 220.01, 221.08, 221.09, 221.1, 221.14, 230

(56) References Cited

U.S. PATENT DOCUMENTS

| | | | |
|---|---|---|---|
| 5,440,626 A | * 8/1995 | Boyle et al. | 379/219 |
| 5,454,034 A | * 9/1995 | Martin | 379/230 |
| 5,680,437 A | * 10/1997 | Segal | 379/15.01 |
| 6,028,914 A | * 2/2000 | Lin et al. | 379/14 |
| 6,487,286 B1 | * 11/2002 | Reaves et al. | 379/221.1 |
| 6,515,985 B2 | * 2/2003 | Shmulevich et al. | 370/356 |
| 6,522,741 B1 | * 2/2003 | Crowl | 379/207.11 |
| 6,678,242 B1 | * 1/2004 | Simon | 370/218 |
| 2002/0131427 A1 | * 9/2002 | Niermann | 370/401 |
| 2003/0118001 A1 | * 6/2003 | Prasad et al. | 370/352 |

* cited by examiner

Primary Examiner—Harry S. Hong (57) ABSTRACT

Migration of a circuit-based-switch to a packet-based-soft-switch in a SS7 telecommunications network is accomplished with no disruption to subscriber service and retains and reuses the assigned signaling point code (SPC) of the existing circuit-based-switch. The system and method inserts a new soft-switch between an SS7 signaling transfer point (STP) and the existing circuit-based-switch in a way where traffic is split incrementally off the circuit-based-switch to the soft-switch so that no administrative changes are required at either the STP or the existing circuit-based-switch. The soft-switch is gradually cutover to act as a proxy STP and tandem switch for the existing circuit-based-switch and routes all calls to and from the network on behalf of the existing switch. The system makes use of multiple internal networks of the soft-switch to accomplish the controlled routing of bi-directional traffic. The circuit-based-switch can eventually be removed from service after subscribers are migrated to the new soft-switch.

20 Claims, 9 Drawing Sheets

METHOD AND APPARATUS FOR SHARING POINT CODES IN A NETWORK

BACKGROUND OF THE INVENTION

1. Field of the Invention

The present invention generally relates to telecommunications and, more particularly, to circuit-based switching convergence with packet-based-switching involving retention and sharing of an existing Signaling Point Code.

2. Background Description

Communications infrastructure throughout the world has undergone constant evolution. Much of the world's infrastructure in the public switching domain is comprised of several different technologies. Public switched telephone networks (PSTN) are heavily entrenched with circuit-based-switches and one technology of preference to support PSTN operations is common channel signaling system No. 7 known also as SS7. SS7 is a global standard for telecommunications defined by the International Telecommunications Union (ITU) Telecommunications Standardization Sector (ITU-T).

The standard defines the protocols and procedures used by network elements in the PSTN to exchange information over a digital signaling network to enable establishment, routing, and control of calls. The ITU definition of SS7 allows for national variants such as European Telecommunications Standards Institute (ETSI) standards that are used in Europe and, for North America, the Bell Communications Research and American National Standards Institute (ANSI) versions are used. SS7 calls are of various natures including wireless (cellular), wireline, data, and a plethora of telephone and data customer features such as credit card validation, voice-mail access, paging, banking access, voice conferencing, data connectivity, Internet access, etc.

SS7 networks and protocols are typically used for basic call setup, management, and release, local number portability, toll free and toll wireline services. It also supports enhanced call features such as call forwarding, calling party name/number display, three way calling, wireless services such as personal communications services (PCS), cellular roaming, and mobile subscriber identification.

SS7 messages are exchanged between network elements over 56 or 64 kilobit per second bi-directional channels called signaling links. The three kinds of network elements in a SS7 network include a Service Switching Point (SSP), a Signal Transfer Point (STP), and a Service Control Point (SCP).

SSPs are switches that originate, terminate and release circuits to manage calls. SSPs can query an associated SCP to determine routing information on a given call. SCPs contain centralized databases.

Network traffic between signaling points can be routed by an STP packet switch. An STP routes incoming messages to an outgoing signaling link based on routing information contained in an SS7 message. To properly address and transport a signaling message, signaling points are uniquely identified by a Signaling Point Code (SPC). SPCs are contained in the routing label of the signaling message. An SPC is a 24-bit address that is partitioned in three fields: network identifier, network cluster and the network cluster member. The value in the network identifier field directly identifies the network to which a point code belongs.

A cluster is defined as a group of SPs that directly home on a mated STP pair. There can be a maximum of 255 SPs per cluster. This limit can be easily exhausted. Therefore, introduction of a new SP with a new SPC can be very problematic. According to ANSI standard T1.111.4, all SS7 messages received by network provider interconnecting STP must have an MTP L3 Network Indicator field encoded to National Networks (meaning message is formatted for national networks).

Only one primary SPC can be associated with an MTP L3 Network. The Multiple MTP Internal Networks capability of this invention allows to have up to 32 MTP internal networks, but more could be established, each associated with one primary SPC and some secondary SPCs. The SPC in each of 32 networks is used to create it's own linkset and routeset data. All information defined per each network is independent of each other and may represent specific configuration. For Shared Point Code mapping, a logical mapping mechanism is implemented to associate one network to another so that routing is or is not permitted from one network to another. In the past, migrating from one switch to another required extensive use of physical links and substantial database configuration changes.

For redundancy needs, SCPs and STPs are usually deployed in mated pairs. Links between signaling points are also typically provisioned in pairs. An SSP typically has links to two separate STPs. SS7 links are of different logical functions. These links are known as A-links, B-links, C-links, D-links, E-links, and F-links each having a particular function. For example, A-links connect a signaling end point (e.g. STP or SSP) to an STP. An F-link typically connects two signaling end points (i.e., SSPs and SCP) and not usually used in networks with STPs, however F-links can be employed to provide testing capabilities.

PSTN circuit-based-switches commonly employ time-division-multiplexing (TDM) techniques to facilitate call connections throughout the network and employ SS7 to facilitate the signaling. TDM is a circuit-oriented transmission mechanism and reaches capacity constraints and throughput limitations quickly relative to packet-based transmission mechanisms. Historically, TDM has been a dominant technology and has broad deployment penetrations worldwide. Substantial financial and technological investment currently exists in TDM switches.

The advancement of technologies has propelled packet-based switching transmission systems to levels of service that make it possible to aggregate communications for voice and data together in a packet switch. In general, packet-based switching networks have greater overall bandwidth potential compared to circuit-switched networks. Further, packet-based switching is finding strong acceptance in such services as the Internet, banking, video services, general business commerce and the like.

The advent of soft-switches, those which typically utilizes Internet Protocol (IP) and/or Automatic Transfer Mode (ATM) technology to unify data and voice switching at very high bandwidth levels provides new telecommunication and data capabilities and thus provides a very attractive alternative to the more ubiquitous, circuit-based-switches. Soft-switches typically employ digital signal processors (DSPS), high-powered microprocessors, or even custom silicon to process the packet message traffic for both voice and data.

Soft-switches are becoming reasonable and desirable choices for PSTNs throughout the world and even for private networks. The overall costs for soft-switches are typically lower than those of comparable circuit-based switches. Further, greater development potential exists for software-driven applications to be combined or offered as options in soft-switching architectures as compared to their traditional circuit-based-switch counterparts. Soft-switches, as the name implies, rely extensively on embedded and layered software instead of traditional hardware-based solutions to create logical associations, easily maintainable and extendible features, and to provide unique applications and solutions in general. PSTN operating companies, as well as private corporations, have begun to invest heavily in soft-switch technologies to achieve these advantages over circuit-based switches.

Major obstacles to the conversion of switching network infrastructures exist, including the investment in circuit-based and the technical difficulties involving the actual physical conversion of a circuit-based switch to packet-based switch, while it is in operation and processing subscriber calls, and without significant disruption in services. Telecommunications service disruption is extremely undesirable to customers, even for relatively short periods of time. Additionally, adding new switches in a network, for capacity or technology reasons, can cause substantial support and database configuration update burdens on operating companies. Adding new equipment to an existing network can be a logistical challenge and must be accomplished with minimal disruptions to the existing network and customer base. Finally, information changes, such as usually considered an undesirable risk addressing and routing in existing and operating networks since it may cause inadvertent disruptions.

In general, transparent operations and incremental additions to feature capabilities are desired expectations when expanding networks. The convergence of packet-based switching and circuit-based switching technologies requires new techniques to overcome the numerous obstacles in converting from the traditional circuit-based switches to the more flexible and cost effective soft-switches.

SUMMARY OF THE INVENTION

It is therefore an object of the invention to provide a method and apparatus for sharing signaling point codes between a circuit-based-switch (CBS) and a packet-based-switch (PBS) during and after the convergence of service from an existing circuit-based-switch to a new packet-based-switch.

It is another object of the invention to provide a method to migrate subscribers from a circuit-based-switch to a packet-based-switch transparently so subscribers will not be burdened with service disruptions.

It is yet another object of the invention to provide a means to transparently replace a circuit-based-switch with a packet-based switch so that minimal disruptions or administrative changes to the existing public switching network is required.

Further, it is yet another objective of the invention to provide a means to bi-directionally route traffic between a packet-based-switch and circuit-based-switch so that signaling point codes of a SS7 network are reused, shared, and retained.

Further, it is still another objective of the invention to permit subscribers to be moved gradually over a period of time from the circuit-based-switch to the packet-based-switch with minimal service disruption so that both the circuit-based-switch and the packet-based-switch co-exist simultaneously to provide seamless service to current subscribers on both switches and also to new subscribers on the packet-based-switch.

Furthermore, it is yet another objective of the invention to create a proxy STP within the packet-based-switch to permit transparent routing of traffic between the circuit-based-switch and the STP when the packet-based-switch is inserted between them.

According to the invention there is provided a method and system to permit migration of subscribers and services from an existing TDM circuit-based-switch, which is a part of a SS7 PSTN (or private) network and serving as an SSP, to a new packet-based-switch. This invention serves to facilitate convergence of TDM circuit-based-switches to packet-based technologies and also provides for the sharing, retention, and reuse of an assigned SS7 signaling point code (SPC) of the circuit-based-switch. The method and system provides substantially transparent migration so that minimal network modification is required and negligible impact on subscriber service occurs. This is accomplished by the innovative use of novel and new capabilities within a packet-based-switch, or soft-switch such as the Siemens SURPASS hiQ9200, to progressively assume the role of the circuit-based-switch and become a proxy for the circuit-based-switch. The packet-based-switch is installed and configured to co-exist simultaneously with an existing circuit-based-switch populated with subscribers so that an STP of a SS7 network routes traffic to destinations and subscribers associated with the circuit-based-switch, through the packet-based-switch.

To accomplish this, a soft-switch is installed and configured in stages to permit incremental assumption of bi-directional traffic routing between an existing circuit-based-switch and the STP. The goal ultimately is the gradual transfer of circuit-based-switch subscribers to the packet-based-switch and, when appropriate, removal of the circuit-based-switch with little disruption in service and minimal administration changes in existing network elements. This invention involves the co-existence of an established and functioning circuit-based-switch simultaneously with a newly installed packet-based-soft-switch and the migration from the "old" circuit-based-switch to the "new" packet-based-switch. This invention permits co-existence of these two systems using a shared SPC. The "old" switch may or may not be retired at the discretion of the operating company.

The soft-switch is first connected to the circuit-based-switch via a SS7 F-link or A-link and is assigned a new SPC. The soft-switch employs a new and powerful concept of multiple internal networks to manage the routing of traffic that will be expanded on below. An internal network is a software arrangement that represents traffic and interfaces by origination sources and termination destinations and provides a simple means of aggregating traffic types, permitting easier administration, and subsequently simplifying routing decisions.

An F-link configuration is used if substantial test traffic will be introduced to validate the integrity of the configuration prior to actual live subscriber service, otherwise an A-link configuration can be implemented after testing occurs or can be implemented immediately if no testing will be involved. Both switches are configured to support this new link and to recognize the new SPC of the packet-based-switch to circuit-based-switch linkset.

The packet-based-switch is also configured to accept a new SS7 A-link between itself and an STP node of SS7 network. However, the SPC assigned to the packet-based-switch to support this new link is purposely made identical to the assigned SPC of the circuit-based-switch, which is important to the transparent migration and sharing of the SPC and a critical aspect of this invention. Since the packet-based-switch is to become an intermediary for the circuit-based-switch, routing means is established within the packet-based-switch so that traffic that flows from the STP and meant for subscribers resident on the circuit-based-switch is recognized and identified at the packet-based-switch and is routed directly to the circuit-based-switch for termination. Conversely, routing functions in the packet-based-switch is established so that traffic originating at the circuit-based-switch is routed either to subscribers within the packet-based-switch or is routed onward to the STP and the network depending on the subscriber dialing requests.

Several types of routing mechanisms exist and are employed in the art and are known to those skilled in the art, but this mechanism is enhanced with multiple internal networks to simplify convergence. Once these connections, assignments and routing means are established, the physical connections from the STP to the circuit-based-switch are re-routed to establish new connections comprising a link from the STP to the packet-based-switch and a connection from the packet-based-switch to the circuit-based-switch.

At this point, the packet-based-switch is acting as an STP proxy for the circuit-based-switch, i.e.; the circuit-based-switch that was previously interacting with the STP directly is now interacting with the packet-based-switch as if it were still the STP. Any ISUP trunks connected from the circuit-based-switch to the PSTN are also migrated to the packet-based-switch incrementally in a manner that will minimize risk during the convergence. Once this step is complete, all traffic is routed through and by the packet-based-switch.

This migration method requires no immediate administrative subscriber changes in the circuit-based-switch and requires no administrative changes to the STP. All traffic flows inbound and outbound transparently to the subscribers. Since all traffic now flows through the packet-based-switch, it is a matter of discretionary administrative action to move subscribers from the circuit-based-switch to the packet-based-switch and making necessary routing changes in the packet-based-switch to terminate traffic to any new subscribers on the packet-based-switch. This transfer of subscribers can occur at the convenience of the operating company or responsible entity, which greatly reduces risk to service and reliability. Additionally, no new routing or point codes must be introduced into the SS7 network itself (i.e., at the STP or other existing network nodes) in order to facilitate the transfer of service from the circuit-based-switch to the packet-based-switch. This greatly reduces risk of incorrect routing or disruption of service within the network overall.

It is possible for a soft-switch to migrate all traffic to a packet-based network and eventually eliminate the need for any SS7 type networks.

So to recap the invention as a system, this invention includes a system for use in a communication network for transparently sharing a signaling point code between a circuit-based-switch and a packet based switch comprising a circuit-based-switch with local subscribers, the circuit-based-switch having an assigned first signaling point code; a packet-based-switch having an assigned second signaling point code; the packet-based switch connected to a signaling transfer point; a SS7 signaling link between the circuit-based-switch and the packet-based switch; and a routing function to route traffic to the circuit-based-switch local subscribers from the packet-based switch so that the first signaling point code matches the second signaling point code, that is the signaling point code is reused.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A DETAILED EMBODIMENT OF THE INVENTION

Common Channel Signaling System No. 7 (SS7) is a global standard for telecommunications defined by the International Telecommunications Union (ITU). The standards defines procedures and protocols by which network elements in a SS7 network public switched network (PSTN) exchange information over digital signaling networks SS7 messages are exchanged over 56 or 64 kilobit per second bidirectional channels known as signaling links.

Figure 1:
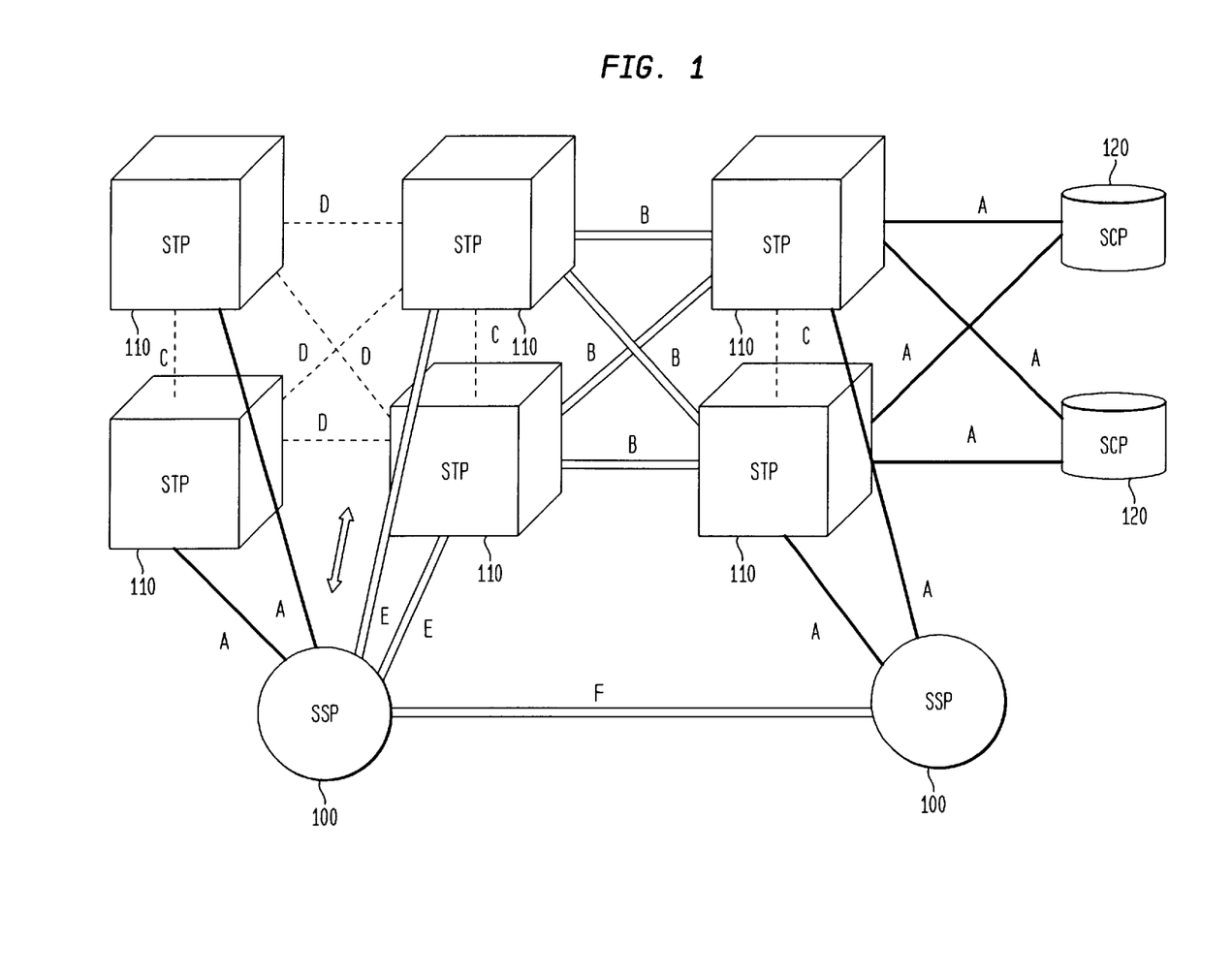
FIG. 1 is an exemplary block diagram of SS7 network elements and their relationships using various link types.

Each signaling point in the SS7 network is uniquely defined by a numeric point code. Each signaling point uses a routing table to select the appropriate signaling path for each message. Referring to FIG. 1, there are three types of signaling points in a SS7 network, a Service Switch Point (SSP) 100, a Signaling Transfer Point (STP) 110, and a Service Control Point (SCP) 120. These SS7 concepts are well known to those skilled in the art. SSPs are switches that originate, terminate or tandem calls and are the access point for subscribers in the PSTN. An SSP may query an SCP for routing information. Network traffic between signaling points may be routed via an STP packet switch. An STP routes each incoming message to an outgoing signaling link based on routing information in the SS7 message. An STP may perform global title translation, a process by which a destination signaling point is determined from the digits presented in the signaling message. An STP can also act as a firewall to screen SS7 messages exchanged with other networks. An SCP is a centralized database and provides messages to SSPs upon request containing routing numbers associated with a dialed number.

Still referring to FIG. 1, the standard for SS7 defines logical signaling link types ("A" through "F") which are organized based upon their use in the SS7 network. Each of these types indicates a particular meaning and is used in reference to the connection of network elements to one another. FIG. 1 provides an illustration of these relationships. The link type functions are described fully in the SS7 specifications cited previously. Two of these link types "A" and "F" are involved in this invention. An A-link connects a signaling end point (e.g., an SCP or SSP) to an STP. Only messages originating from or destined to the signaling end point are transmitted on an A-link. An F-link links two signaling end points (i.e., SSPs and SCPs). F-links are not usually used in networks with STPs. In networks without STPs, F-links directly connect signaling points. F-links are however useful for bearing test traffic in certain situations.

The remaining link types and functions are: B-links connect STPs (very little distinction with D-links), C-links connects STPs performing identical functions into a mated pair, D-links connect secondary STP pairs to a primary STP pairs, and E-links connects an SSP to an alternate STP.

Figure 2:
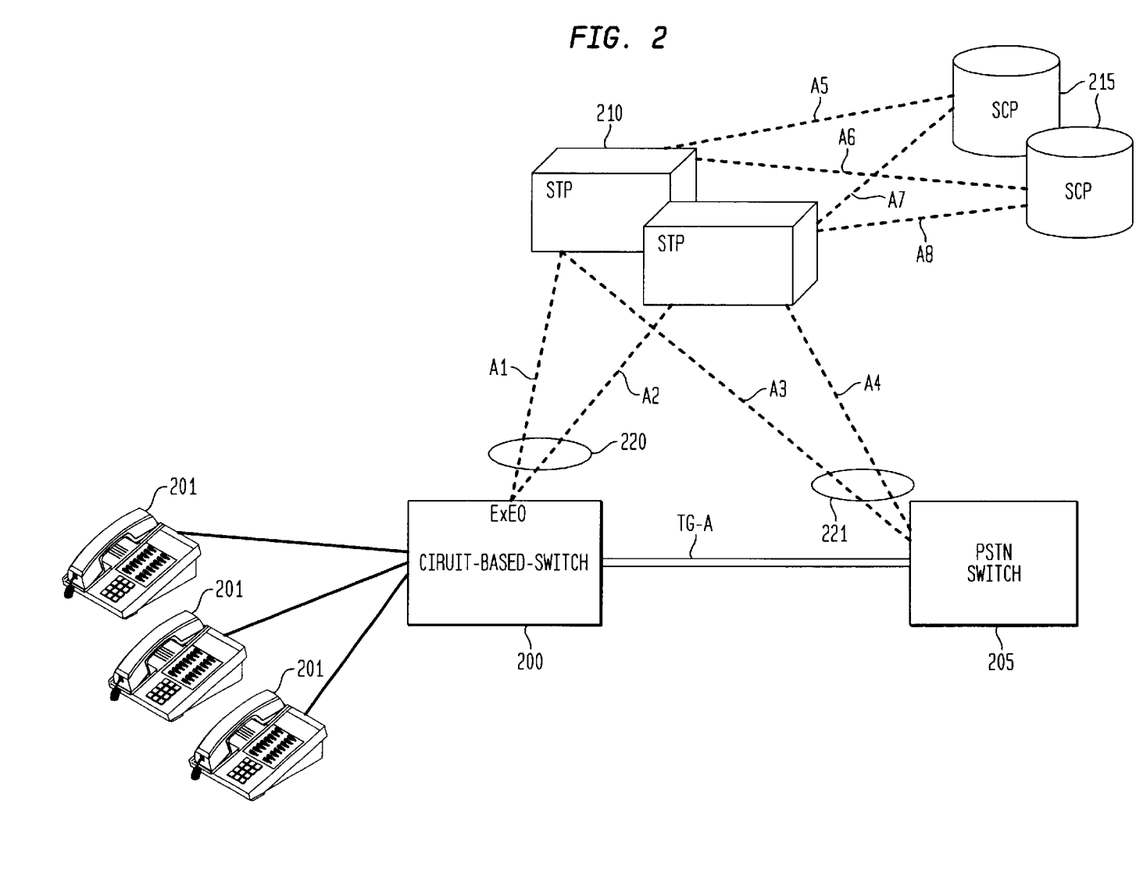
FIG. 2 is an exemplary block diagram of a network configuration in a typical initial arrangement.

Referring now to FIG. 2, an example of a typical existing end office circuit-based-switch (ExEo) 200 is shown with subscribers 201 connected. The ExEo is responsible for routing network and local traffic to and from local subscribers. The ExEo is also connected to a pair of STPs 210 with a combined linkset A1 and A2, 220, which are A-links. Further as an example, the ExEo is also connected to another PSTN switch (or private switched telephone network) 205 via a trunk group TG-A. TG-A can be a TDM Integrated Services Digital Network User Part (ISUP) trunk facility or equivalent. The PSTN Switch 205 is also connected to the same pair of STPs 210 by linkset A3 and A4, 221. PSTN 205 could also be a private network. The STPs themselves are in turn connected by links A5 through A8 to a pair of SCPs 215. FIG. 2 is an illustration of a typical configuration in a PSTN but is meant as an example situation. Traffic originates at subscribers and dialed numbers are processed by embedded computer controls within the ExEo in conjunction with SS7 defined messaging to the STP and SCP in order to route the call. Likewise, incoming traffic is routed from the network to the ExEo, which terminates traffic to appropriate subscribers. FIG. 2 is typically a part of a larger network containing more switches and network elements.

The method of replacing the legacy ExEo with a soft-switch involves the gradual replacement of the TDM network (ExEo) with components of a packet network. The conversion strategy of this invention begins with the installation of a soft-switch, which coexists with the ExEo during the replacement process of the ExEo and shares the SPC of the replaced switch, an essential aspect of this invention. All subscriber traffic is routed to the appropriate network element based on the subscriber location.

Figure 3:
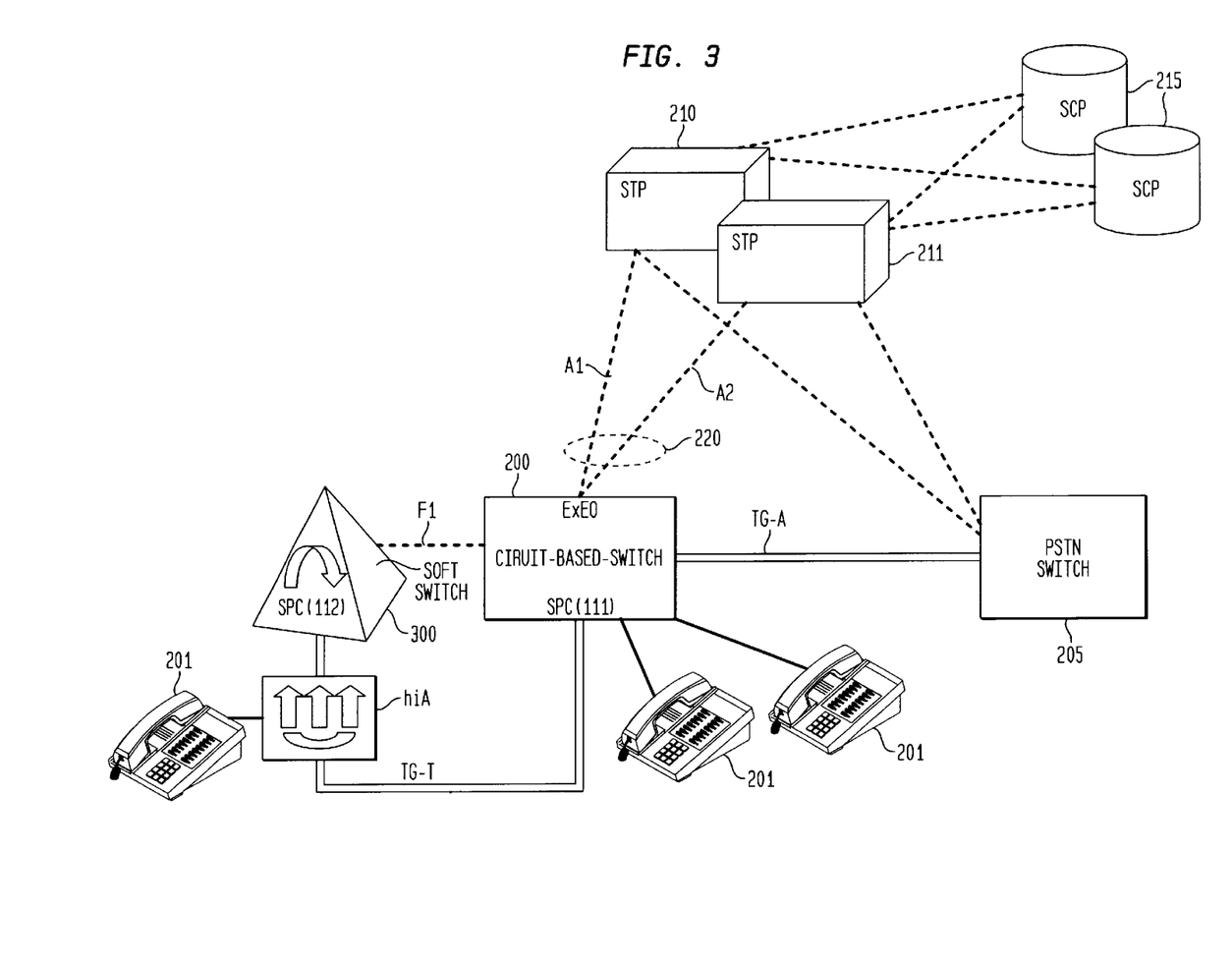
FIG. 3 is a block diagram showing the initial phase of migration to a softswitch.

Referring now to FIG. 3, during the initial convergence period the soft-switch operates as a tandem switch, and then as a combined tandem/Signaling End Point (SEP) when subscriber cutover commences from the circuit-based-switch to the packet-based-switch. A soft-switch typically is composed of several interface gateways, which are added as needed to interface with subscribers or to trunks. There are line gateways shown as hiA in FIG. 3. Trunk gateways, not shown, are also used to connect packet-based-switches to ATM/IP or core packet networks. Other gateways are possible for other types of interfaces.

A trunk group TG-T and an F-link, F1, are added to the soft-switch and the circuit-based-switch to facilitate SS7 testing between the two switches. The F-links may be A-links if testing is by-passed or may become A-links whenever testing is completed. It is also possible to create test traffic using only A-links. Configuration to support the SS7 F-link termination in the soft-switch is made to an internal network (for exemplary reference, NETNO=32) along with one Primary Signaling Point Code shown as SPC=112 in the soft-switch of FIG. 3. A routeset and linkset is established for the F-link with a Destination Point Code matching the ExEo 200, shown as SPC(111) in FIG. 3. In the circuit-based-switch, a new SPC(112), which is the destination point code DPC of the packet-based-switch, is added for the new link. Note this is the only new administrative change required in the circuit-based-switch.

Routesets define which logical collection of trunks may be used to route calls for a given dialed number and the linkset define which physical trunks compose a particular connection path; these two concepts are well established in the telecommunications industry. Linkset is the collection of signaling links, referred to as member links, that connect the SP to an adjacent node such as a STP or another SP. SPC of the adjacent node is used to create/configure linksets in the database of a the SP. A Route set is created for a particular DPC or range of DPCs, by assigning linksets referred to as "route directions", with priority that indicates the desirability of the route. These route directions are Signaling Linksets, which lead either directly to the destination or to an adjacent STP from where the destination can be reached.

Continuing with the process of the migration, new ISUP trunks are installed between the ExEo and the packet-based-switch for testing and configured in the databases of each switch. This is shown as TG-T in FIG. 3. Internal networks are individual database representations of routing information for links, subscribers, and logical associations and are discussed and expanded upon below. There can be multiple MTP internal networks to create logical representations of unique routing patterns limited only by implementation decisions.

These novel multiple internal networks are part of the routing means to transparently route traffic through the packet-based-switch to the circuit-based-switch and to keep separate the traffic from the STP to the subscribers on the packet-based-switch itself. Subscribers are added to the packet-based-switch to facilitate testing of the new F-link (or A-link) connection. Testing includes verification of routing and linkset configuration, dialing resolution, and overall hardware functionality. When testing is complete, the F-links can be converted to A-links, which is a common and known operation.

Figure 4:
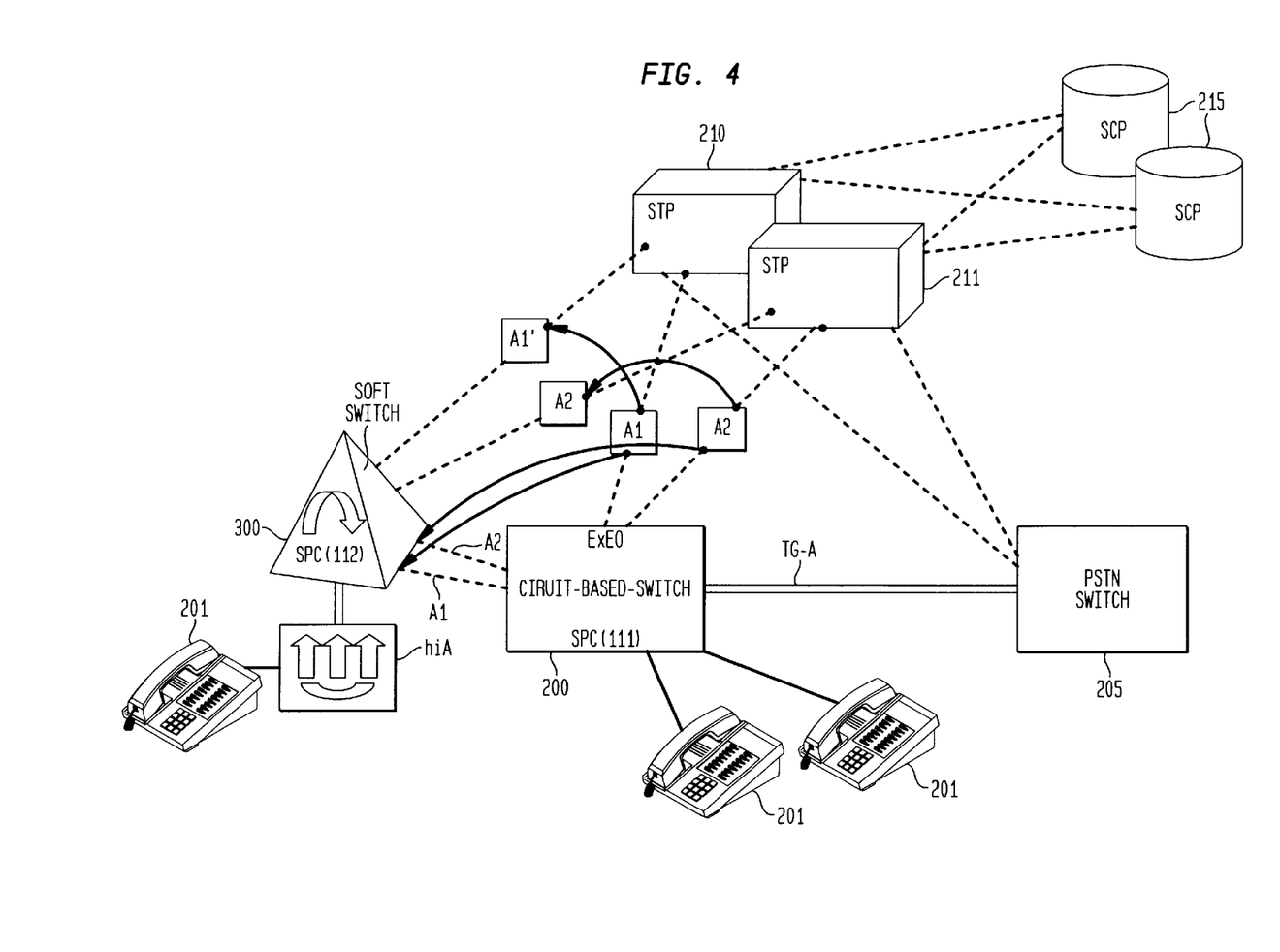
FIG. 4 is a block diagram showing re-routing of links.

The conversion process continues with SS7 re-homing for the ExEo. It is desirable to perform this step during light traffic conditions such as during the night to minimize any possibility of service disruption. Referring to FIG. 4, re-homing will be performed on one link at a time to avoid service disruption. This means that a temporary condition exists after the first link is moved but before the second link is re-homed in that the ExEo will be sending traffic to an STP pair that is not mated. This does not impact service if traffic is not high. The following additions to the soft-switch are required. This step creates a shared SPC and allows for reuse of the existing SPC of the ExEo. An own SPC of 111 (to match the ExEo) is created in an internal network (NETNO=1) which is shared with the ExEo and used by the STP home pair. DPCs are also added to support traffic from and to the ExEo and the hiA.

Next there is created another primary OPC (300) in yet another internal network (NETNO=31) with an A-link consolidator (ALC) feature. The A-link Consolidator (ALC) is an SP within the SS7 signaling network that provides another SP, without any direct connection to the national SS7 signaling network via A-links, access to the SS7 signaling network. A-link consolidator performs gateway functionality for the subtending switching systems that are connected to the ALC. ALC functionality is a known concept in the industry. The ALC is enabled to support signaling form the ExEo to the STP, making routing transparent for the ExEo. Additionally, a secondary SPC is created in this internal network (NETNO=31) to support the STP home pair A1' and A2' (SPC=300,301) which are the SPC codes of the STP pair 210 and 211. It should be noted that this assignment means that Internal network 31 with OSPC=300 is basically now the proxy STP of the STP 210.

New routesets and linksets are created in the internal network (NETNO=31) to support SS7 routing from the existing switch to STP and PSTN and from PSTN to the ExEo. New physical links are connected from the soft-switch to the STP home-pair, one link at a time so traffic is not disrupted, after blocking SS7 traffic (one link at a time) on the ExEo and rerouting and re-connecting the wiring from the ExEo to the soft-switch also one link at a time in unison with the corresponding link from the STP to the soft-switch.

FIG. 4 illustrates this re-routing and reconnection. Link A1 is blocked at the ExEo; then re-routed as shown followed by re-enabling A1 in the ExEo. Then in like manner, blocking A2 and re-routing followed by re-enabling A2. No point codes of the STP pair have been changed during this procedure. The soft-switch is now a proxy for the ExEo and is effectively a mini-STP for the ExEo. Incoming traffic from the STP can be routed to the packet-based-switch local subscribers or forwarded to the ExEo subscribers as appropriate.

Figure 5:
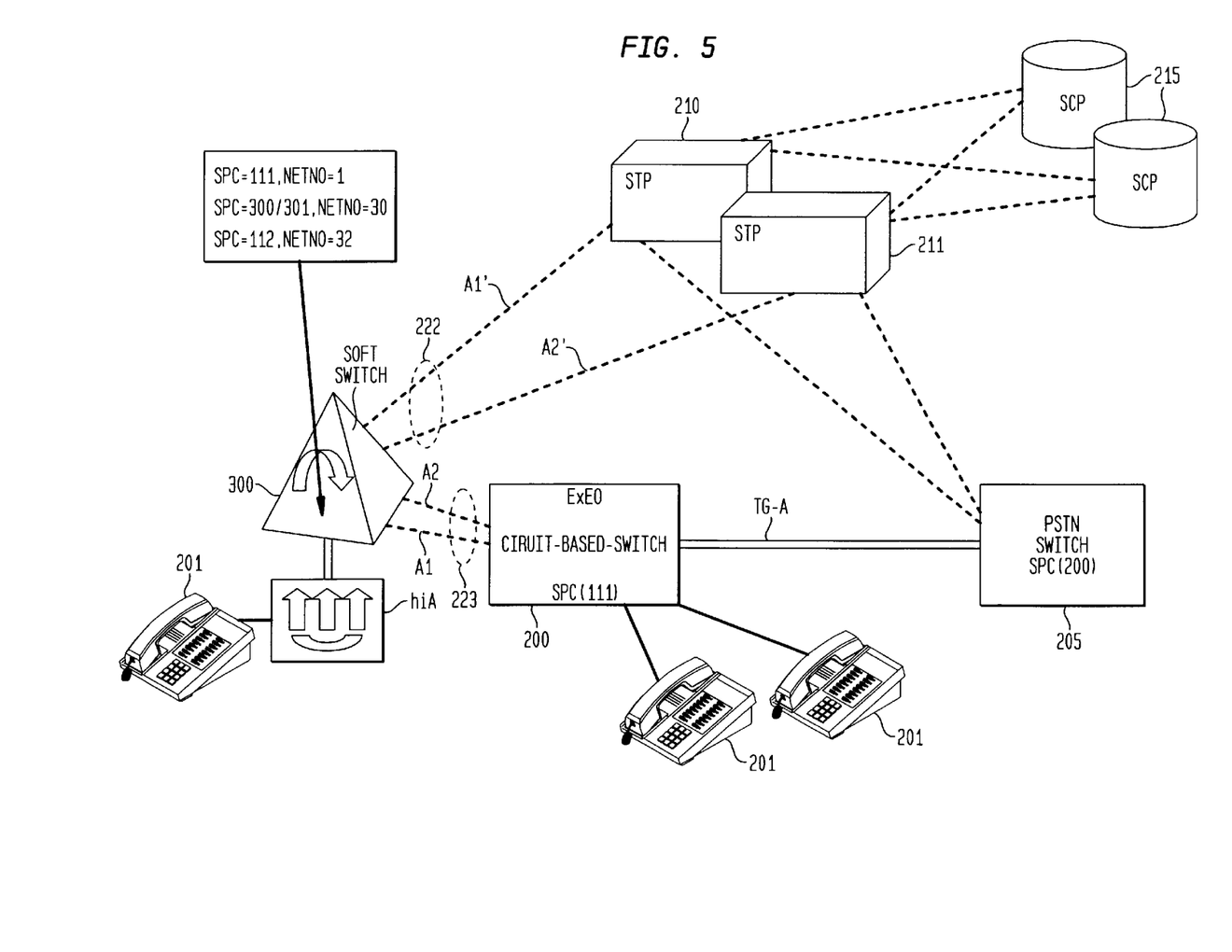
FIG. 5 is a block diagram showing a configuration after re-routing of links.

FIG. 5 shows the resulting configuration at this stage of the convergence. Links A1" and A2' connect the STPs to the soft-switch and links A1 and A2 connect the ExEo to the soft-switch. As a result of the example conversion process as discussed above, the soft-switch now has three internal network configurations that includes (NETNO=1, SPC= 111), (NETNO=30, SPC=300,301), and (NETNO=32, SPC= 112). The above process used three internal networks (one of which, NETNO=32, was used for testing) but if more existing end offices were to be included in a conversion, more internal networks would be employed with additional supporting database and routing configurations consistent with the discussion above. The following table explains the idea of multiple internal networks and the relationships of elements that are associated with internal networks.

The following table uses configurations shown on one or more Figures. The system may define as many multiple internal networks as necessary to represent unique routing arrangements. Relationships and rules can be established, as necessary, to restrict interaction of one network with another, or to create a relationship among internal networks.

| NETNO | pOPC | DPC | Routeset |
|---|---|---|---|
| 1 | 111 | 300 | A1', A2' |
|  |  | 301 | A2', A1' |
|  |  | 305 | Combined linkset 222 |
|  |  | 200 | Combined linkset 222 |
| 31 | 300 | 111 | A1 |
| 32 | 112 | 111 | F1 |

Figure 6:
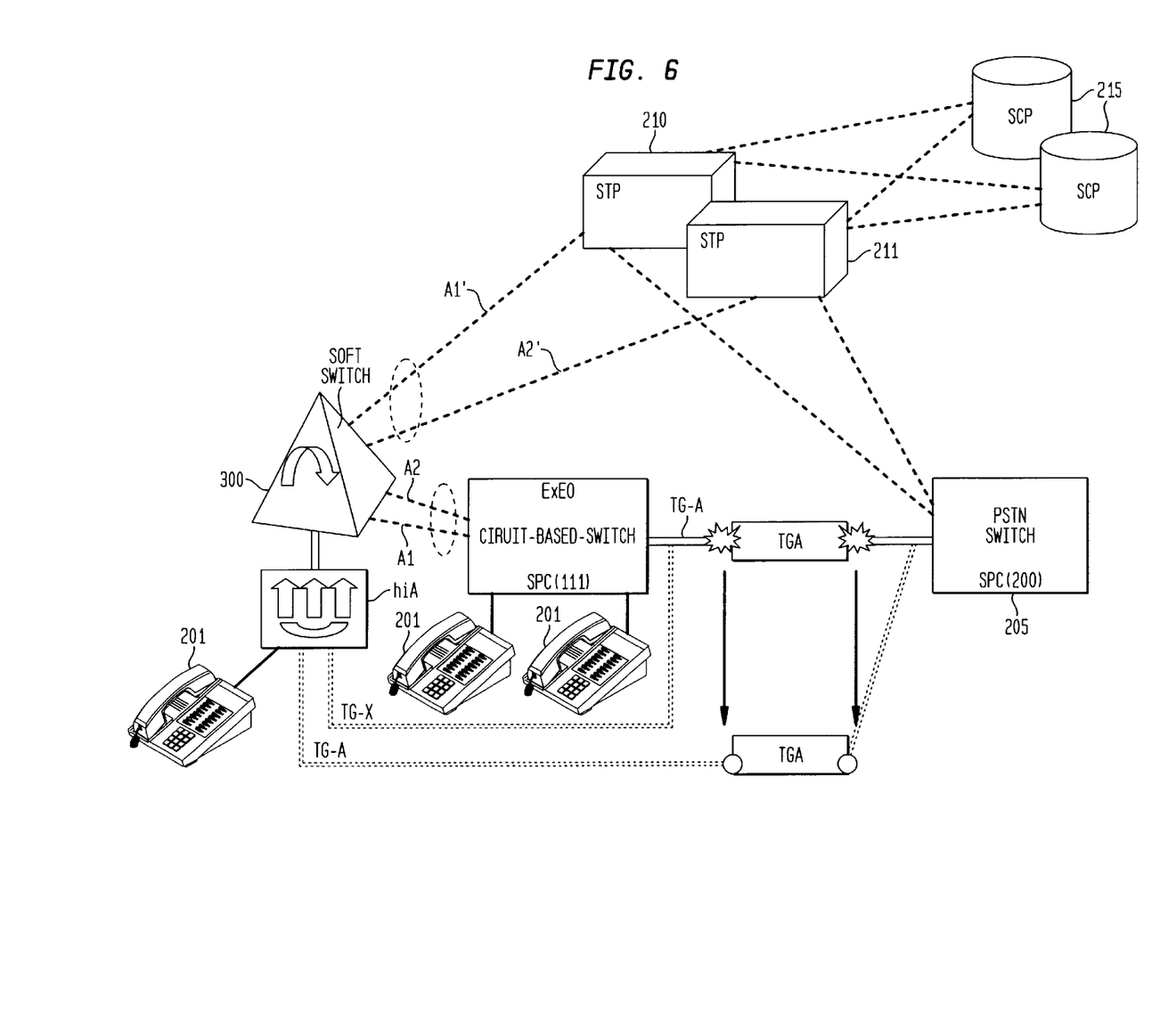
FIG. 6 is a block diagram showing the splitting and re-routing of trunk group TG-A into two separate trunk groups, TG-X and TG-A'.

Before subscribers are cutover or moved from the ExEo to the packet-based-switch, ISUP trunk cutover must be performed. Referring to FIG. 6, the goal of this step is to re-route the ISUP trunk (shown as TG-A) traffic so that all of this traffic is handled and routed by the packet-based-switch and not by the ExEo. This will effectively isolate the ExEo from all network connections except to the soft-switch so that after all subscribers are moved from the ExEo to the soft-switch, the ExEo may be taken off-line entirely.

To accomplish this, TG-A is to be split into two partitions, shown as TG-A' and TG-X. The following additions are required to the soft-switch configuration. Creation of one or more secondary OPCs (sOPC=200,201, etc) for every ISUP trunk group to be created between the ExEo and the hi-A of the packet-based-switch using primary OPC (300) to support call origination from the ExEo. These sOPCs are created in NETNO=31, in conformity to the illustrative example of this invention. The number of ISUP trunk groups is related to traffic capacity requirements.

FIG. 6 shows one trunk group for this purpose, TG-X, but there could be more (TG-Y, TG-Z, etc.). Creation of ISUP trunk group(s) TG-X (TG-y, TG-Z, etc) to ExEo is made and associate with secondary OPCs (200,201,202, etc) and DPC (111) in internal network (NETNO=31). Also another ISUP trunk group(s) TG-A' (TG-B', TG-C', etc, not shown) is created and configured with trunks blocked that will support connections and traffic to the PSTN instead of TG-A in the ExEo. This trunk group is associated with OPC (111) and DPC (200), also in conformity to the illustrative example of this invention.

Physical re-routing of TG-A can proceed. A partition of trunks within TG-A are serviced blocked in the ExEo and these trunks are split-off and connected to the hi-A of the soft-switch and is shown as TG-X. After reconnection, these trunks are re-activated. The remaining partition of trunks of TG-A are now blocked in the ExEo and reconnected between the PSTN and hi-A of the soft-switch, unblock this trunk group in the soft-switch. Now all calls form and to the PSTN are routed via the packet-based-switch. At this point, the soft-switch behaves as both a mini-STP (as a proxy STP for the ExEo) and as a Tandem switch and all incoming traffic from the STP will be rerouted by the soft-switch to the ExEo based on subscriber routing information (NPA-NXX-XXXX) for ISUP. Signaling Call Control Part/Transaction Capability Application Part (SCCP/TCAP) traffic will be rerouted based on subscriber's Transaction Identifier (TID).

Likewise, all originating traffic from the existing office will now be routed first to the packet-based-switch where it is immediately routed towards the STP. All bearer traffic is handled by the soft-switch. New subscribers can now be added to the packet-based-switch.

Figure 7:
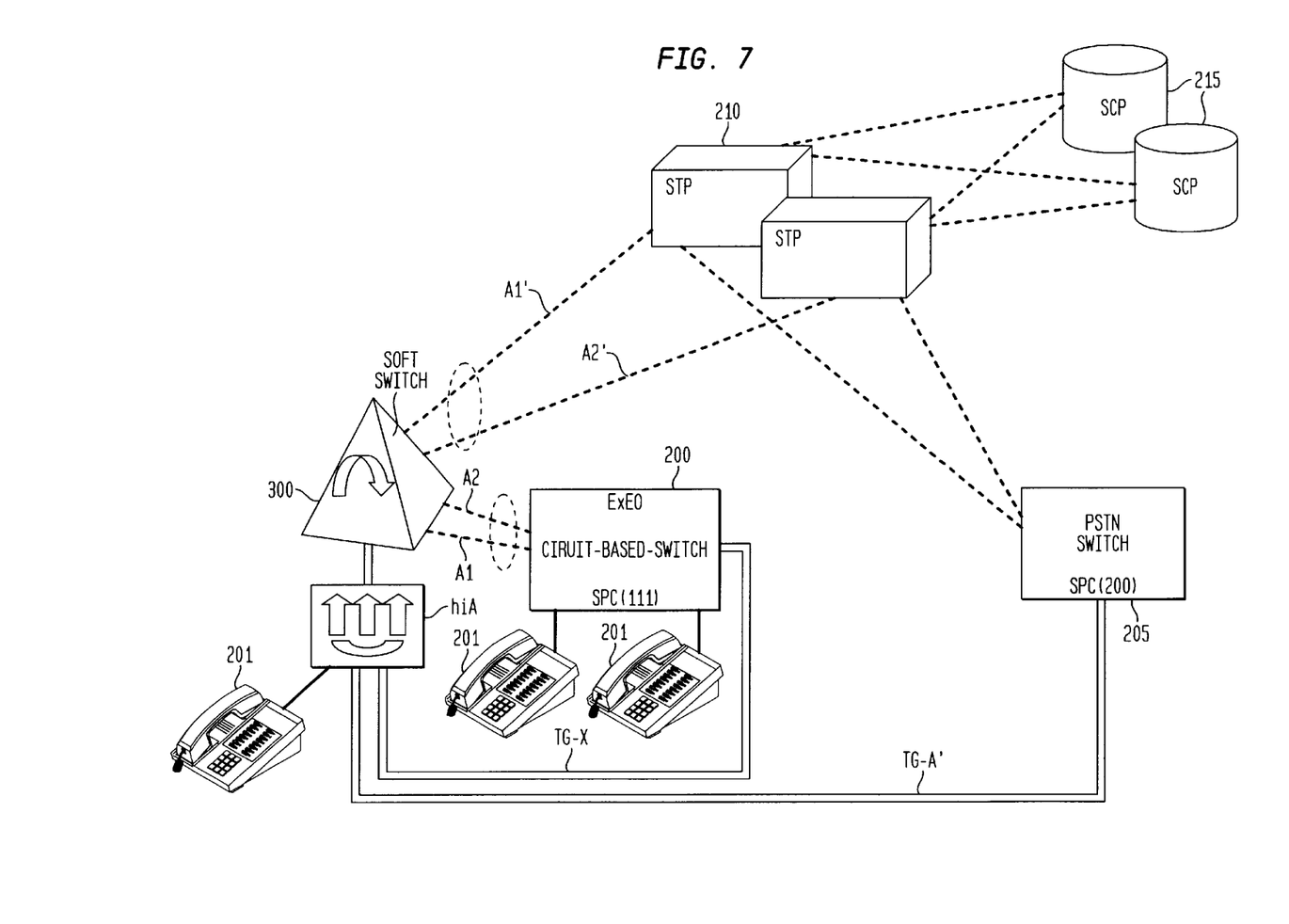
FIG. 7 is a block diagram showing resulting configuration after splitting and re-routing of TG-A.

FIG. 7 shows the resulting configuration of the convergence of the circuit-based-switch to a packet-based-switch. Trunk group TG-A has been replaced by trunk groups TG-A' and TG-X. No administrative changes were required in the PSTN database or the ExEo database and the SPC of the ExEo was reused, shared, and retained by the packet-based-switch.

Figure 8A:
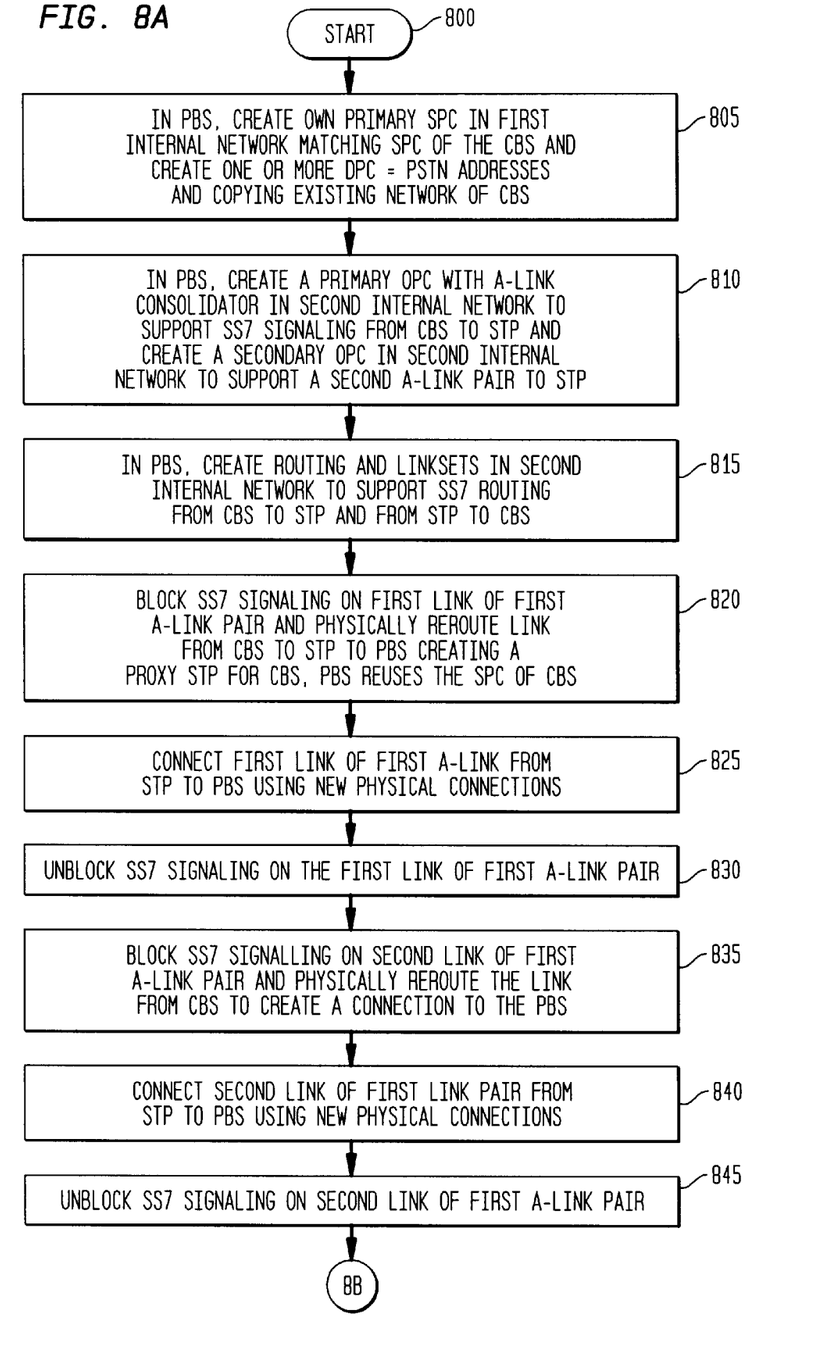
FIG. 8A is a flow chart showing the steps to migrate a packet-based-switch to a circuit-based-switch while reusing a signaling point code.
Figure 8B:
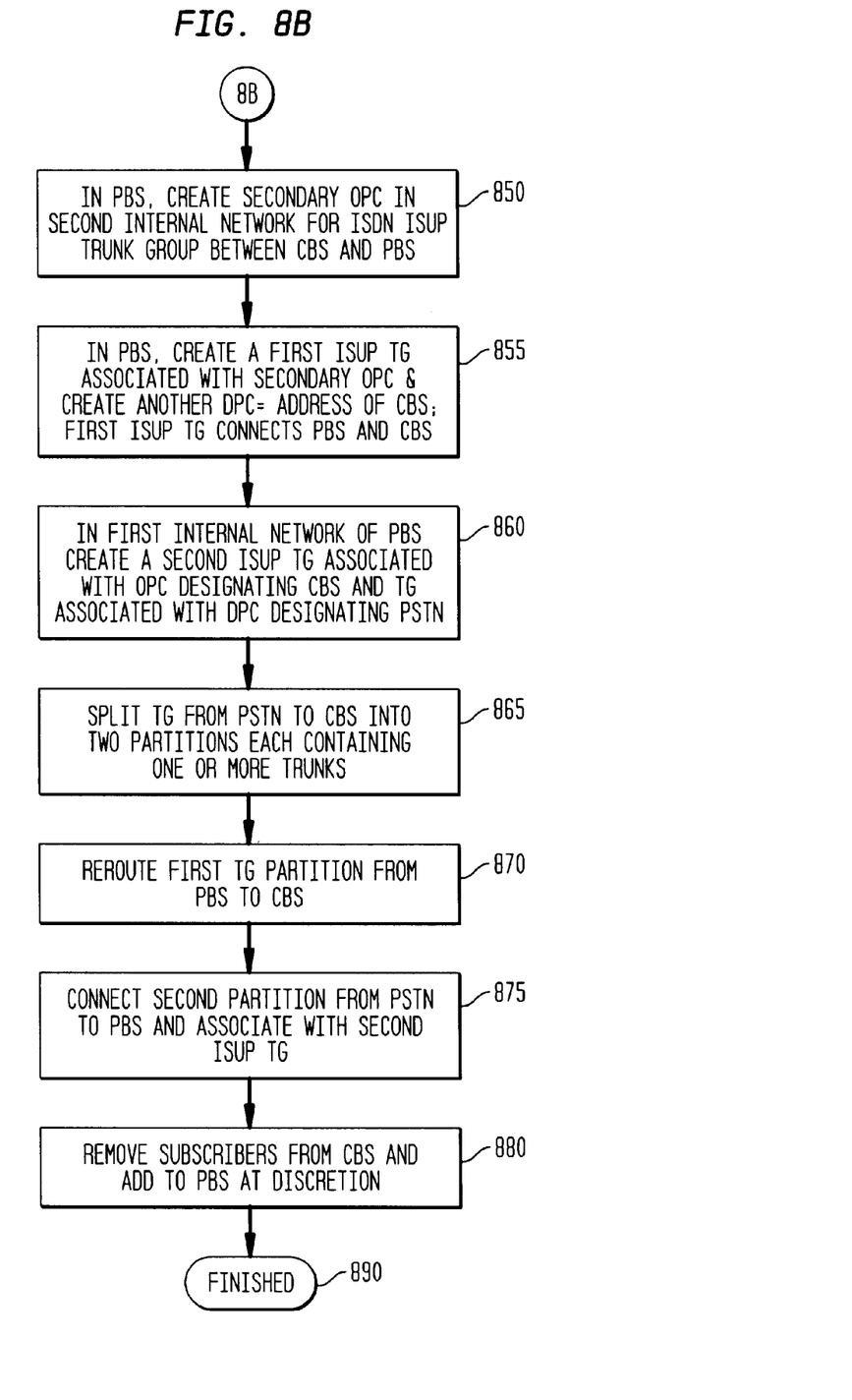
FIG. 8B is a flow chart that further shows the steps to migrate a packet-based-switch to a circuit-based-switch while reusing a signaling point code.

FIG. 8A and 8B are flow diagrams showing the steps involved in this convergence method of the invention. Referring to FIGS. 2–7 simultaneously with FIGS. 8A and 8B, the method begins at the start point shown as 800. The method proceeds at step 805 with the creation of an own primary SPC in a first internal network of a packet-based-switch 300 (which is installed to co-exist with an existing circuit-based switch 200) so that this own SPC matches the SPC of the circuit-based-switch 200. One or more DPCs are also created in this internal network matching PSTN addresses.

At step 810, within the packet-based-switch 300, a primary SPC with A-link consolidator is created in a second internal network to support SS7 signaling from the circuit-based-switch to the STP 210 also a secondary OPC in the second internal network is created to support to support a second A-link pair to the STP.

At step 815, routing and linksets are created in the packet-based-switch second internal network to support SS7 routing from the circuit-based-switch to the STP and from the STP to the circuit-based-switch.

At step 820, physical rerouting of the first A-link occurs by blocking (i.e., prevent the circuit-based-switch from choosing the link, which is a common practice in switching operations) the first link A1 of the A-link pair 220. This link is rerouted to the packet-based-switch (creating a connection from the circuit-based-switch to the packet-based-switch) which establishes the packet-based-switch as a proxy for the circuit-based-switch since the packet-based-switch is reusing the SPC of the circuit-based-switch.

At step 825, new physical connections are made connecting first link A1' of first A-link pair 222 from STP to the packet-based-switch.

Step 830 unblocks the SS7 signaling which was previously blocked at step 820 on the first link A1 of the first A-link pair 223, which is equivalent to A-link pair 220 from the circuit-based-switch perspective.

Step 835 begins the process of moving the second link of the first A-link pair. SS7 signaling is blocked on second link A2 of first A-link pair 220 and physically rerouted creating a connection from the circuit-based-switch to the packet-based-switch. This step mimics step 820 which deals with the first link of the first A-link pair.

At step 840, the second link A2' of the first A-link pair 222 is connected from STP to the packet-based-switch using new physical connections.

Step 845 unblocks signaling on second link A2 of first A-link pair 220.

Referring now to FIG. 8B, and simultaneously with FIGS. 2–7, the process continues with the migration of PSTN ISUP trunks. Step 850 shows the creation in the packet-based-switch of a secondary OPC in a second internal network for an ISDN ISUP trunk group (TG) between circuit-based-switch and packet-based-switch.

Step 855 shows the creation in the packet-based-switch of a first ISUP trunk group and has associated a secondary OPC. Another DPC is created so that it matches the address of the circuit-based-switch. This ISUP trunk group connects the packet-based-switch with the circuit-based-switch.

Continuing with step 860, in the first internal network of the packet-based-switch a second ISUP trunk group is created and associated with an OPC designating the circuit-based-switch and also sets the DPC designating the PSTN.

Step 865 shows the logical partitioning and splitting of the trunk group TG-A from the PSTN to the circuit-based-switch into two partitions shown as TG-X and TG-A' in FIGS. 6 and 7 each containing at least one trunk. Typically the partitions are equal but this is not a requirement.

Rerouting of the first trunk group partition is made as shown in step 870 to create a connection from the packet-based-switch to the circuit-based-switch as shown in FIGS. 6 and 7 as TG-X.

Step 875 shows the connection of the second partition TG-A' from the PSTN to the packet-based-switch and is associated with the second ISUP trunk group in the packet-based-switch.

At step 880, subscribers are removed from the circuit-based-switch and added to the packet-based-switch at the discretion of the operating company. The method and migration process is concluded at step 890.

While the invention has been described in terms of preferred embodiments, those skilled in the art will recognize that the invention can be practiced with modifications and in the spirit and scope of the appended claims.

Having thus described our invention, what we claim as new and desire by letters patent is as follows:

1. A communication system for transparently sharing a signaling point code between a circuit-based-switch and a packet-based-switch comprising:

a circuit-based-switch with an assigned signaling point code, said circuit-based switch connected to a signaling transfer point (STP) in a signaling system number seven (SS7) switching network, wherein said circuit-based-switch routes traffic to local subscribers;

a packet-based-switch in a packet based network connected to said STP; and a SS7 link between said circuit-based-switch and said packet-based-switch, wherein traffic originating within the packet-based-switch is routed using the SS7 link to said circuit-based-switch said packet-based-switch reusing said assigned signaling point code.

2. A communication system according to claim 1, wherein the said SS7 link is an A-link.

3. A communication system according to claim 1, wherein the said SS7 link is an F-link.

4. A communication system for transparently sharing a signaling point code between a circuit-based-switch and a packet-based-switch comprising:

a circuit-based-switch with an assigned signaling point code, said circuit-based switch connected to a signaling transfer point (STP) in a signaling system number seven (SS7) switching network, wherein said circuit-based-switch routes traffic to local subscribers;

a packet-based-switch in a packet based network; and a SS7 link between said circuit-based-switch and said packet-based-switch, wherein traffic originating within the packet-based-switch is routed using the SS7 link to said circuit-based-switch said packet-based-switch reusing said assigned signaling point code.

5. A communication system according to claim 4, wherein the said SS7 link is an A-link.

6. A communication system according to claim 4, wherein the said SS7 link is an F-link.

7. A system for use in a communication network for transparently sharing a signaling point code between a circuit-based-switch and a packet based switch comprising:

a circuit-based-switch with local subscribers, said circuit-based-switch having an assigned first signaling point code;

a packet-based-switch having an assigned second signaling point code said packet-based switch connected to a signaling transfer point;

a SS7 signaling link between said circuit-based-switch and said packet-based switch; and means for routing traffic to said circuit-based-switch local subscribers from said packet-based switch so that the first signaling point code matches the second signaling point code.

8. A system according to claim 7, wherein said SS7 signaling link is an A-link.

9. A system according to claim 7, wherein said means for routing routes traffic to said circuit-based-switch, said traffic being previously routed to said packet-based switch from said signaling transfer point.

10. A system according to claim 7, wherein said means for routing routes traffic from said circuit-based-switch local subscribers to said packet-based-switch and thereafter said traffic being further routed by said packet-based-switch to said signaling transfer point.

11. A system according to claim 7, wherein said packet-based-switch is a proxy for the circuit-base-switch, said packet-based-switch reusing said first signaling point code.

12. A method to transparently migrate local subscribers and traffic from a circuit-based-switch in a public switched telephone network (PSTN) to a packet-based-switch said circuit-based-switch having an assigned first signaling point code (SPC) and connected to a signaling system number seven (SS7) network signaling transfer point (STP) via a first A-link pair said packet-based-switch reusing the same first SPC, said method comprising the steps of:

creating own SPC in a first internal network of said packet-based-switch matching said first SPC and further creating one or more destination point code (DPC) matching PSTN addresses;

creating a primary signaling point code (SPC) with an A-link-consolidator in a second internal network of said packet-based-switch to support SS7 signaling from said circuit-based-switch to the STP, further creating a secondary SPC in said second internal network to support a second A-link pair connection to said STP;

creating routing and linksets in said second internal network of said packet-based switch to support SS7 routing from said circuit-based-switch to said STP and from said STP to said circuit-based-switch;

blocking SS7 signaling on a first link of said first A-link pair and physically rerouting said first link of said first A-link pair from said circuit-based-switch connected to said STP to said packet based switch, said packet-based switch becoming a proxy STP for said circuit-based-switch, said packet-based switch reusing said first SPC;

connecting said first link of said first A-link from said STP to said packet-based switch using new physical connections;

unblocking SS7 signaling on said first link of said first A-link pair;

blocking SS7 signaling on a second link of said first A-link pair and physically rerouting said second link of said first A-link pair from circuit-based-switch creating a connection to said packet based switch;

connecting said second link of said first A-link from said STP to said packet based switch using new physical connections; and unblocking SS7 signaling on the second link of first A-link pair.

13. A method according to claim 12, further comprising the steps of:

creating a secondary OPC for an Integrated Services Digital Network (ISDN) User Part (ISUP) trunk group between said circuit-based-switch and said packet-based-switch, said secondary OPC created in said second internal network of the packet-based-switch;

creating a first ISUP trunk group in said packet-based-switch and associating the first ISUP trunk group with said secondary OPC and further creating another destination point code (DPC) matching an address of the circuit-based-switch, said first ISUP trunk group being physically connected to the circuit-base-switch from the packet-based-switch;

creating a second ISUP trunk group in the first internal network of said packet based switch said second ISUP trunk group associated with an OPC designating said circuit-based-switch and said ISUP trunk group associated with DPC designating said public switching telephone network (PSTN);

splitting an existing trunk group from the PSTN to the circuit-based-switch into a first partition and a second partition, each partition containing one or more trunks;

rerouting said first partition from the packet-based-switch to create a new physical connection from the circuit-based-switch to the packet-based-switch said first partition being associated with said first ISUP trunk group; and connecting said second partition from the PSTN to the packet-based-switch, said second partition being associated with said second ISUP trunk group.

14. A method according to claim 13, further comprising the steps of:

removing subscribers from the circuit-based-switch; and adding subscribers to the packet-based-switch.

15. A method according to claim 13, wherein said secondary OPC comprises a plurality of secondary OPC.

16. A method according to claim 13, wherein said first ISUP trunk group comprises a plurality of first ISUP trunk group.

17. A method according to claim 13, wherein the second ISUP trunk group comprises a plurality of second ISUP trunk group.

18. A method according to claim 13, wherein said public switched telephone network is a private switched telephone network.

19. A method according to claim 12, wherein said first A-link pair is a plurality of first A-link pairs.

20. A method according to claim 12, wherein said second A-link pair comprises a plurality of second A-link pairs.

* * * * *